United States Patent [19]
Hamilton et al.

[11] 3,939,818
[45] Feb. 24, 1976

[54] SOLAR ENERGY HEATING MODULE AND ASSEMBLY

[75] Inventors: George Henry Hamilton; Robert McLean Turner, both of Washington, D.C.; Jesse Lee Ward, Jr., Arlington, Va.

[73] Assignee: Solar Energy Company, Washington, D.C.

[22] Filed: Apr. 23, 1974

[21] Appl. No.: 463,358

[52] U.S. Cl. ............................... 126/270; 126/271
[51] Int. Cl.² .............................................. F24J 3/02
[58] Field of Search ............ 126/270, 271; 237/1 A

[56] References Cited
UNITED STATES PATENTS

| | | | |
|---|---|---|---|
| 2,553,073 | 5/1951 | Barnett | 126/271 |
| 2,680,437 | 6/1954 | Miller | 126/270 |
| 2,680,565 | 6/1954 | Lof | 126/271 X |
| 2,998,005 | 8/1961 | Johnston | 126/270 |
| 3,018,087 | 1/1962 | Steele | 126/271 |
| 3,102,532 | 9/1963 | Shoemaker | 126/270 |
| 3,145,707 | 8/1964 | Thomason | 126/271 |
| 3,513,828 | 5/1970 | Masters | 126/271 |
| 3,875,925 | 4/1975 | Johnston | 126/270 |

*Primary Examiner*—Kenneth W. Sprague
*Assistant Examiner*—James C. Yeung
*Attorney, Agent, or Firm*—Pennie & Edmonds

[57] ABSTRACT

The instant invention relates to a solar energy heating module comprising a sealable chamber having cross-flow radiator means therein dividing the chamber into a fluid inlet compartment and a fluid outlet compartment, and, preferably, at least one perforated sleeve in said inlet compartment. The invention also comprises an assembly of the modules into a unitary heater having a common intake manifold.

6 Claims, 6 Drawing Figures

SOLAR ENERGY HEATING MODULE AND ASSEMBLY

BACKGROUND OF THE INVENTION

The use of solar energy to heat fluids is an old and well-known procedure which has in recent years evoked greater interest because of the increasing shortage of fossil fuels which are most commonly used for such heating purposes.

While the basic technology of utilizing the sun's rays to heat a fluid, such as a liquid or a gas, is known, this technology has found limited application because of the difficulty in making apparatus for this purpose which is efficient and relatively inexpensive. In large measure, cost of equipment and of on-site assembly thereof have been a major problem mitigating against use of solar energy cells to heat small structures such as one-family residences.

Thus, most solar heating units must be especially fabricated for the particular structure to be heated. Therefore, such units being custom fabricated are quite expensive and their use generally limited to large commercial or educational buildings. Attempts to overcome this problem by having a standard factory manufactured solar collector for smaller structures have not been successful since such structures vary so widely in heating requirements because of their size differences, various types of construction, local climatic conditions, and the like, that there is no one collector size that is suitable for any large percentage of these structures. Modular units have, heretofore, also not been entirely practical because of the difficulty and cost of assembling and disassembling them for use.

DESCRIPTION OF THE INVENTION

The present invention overcomes the difficulties of the prior art by providing solar energy heating modules which can be used alone or readily assembled into solar heating assemblies of varying capacity dependent upon the heating desired.

Briefly stated, the present invention comprises a solar energy heating module comprising a sealable chamber having cross-flow radiator means therein dividing said chamber into a fluid inlet and a fluid outlet compartment, means to supply a fluid to said chamber, and means to remove fluid from said chamber. In its preferred embodiment, the invention includes at least one perforated sleeve in said inlet compartment. The invention also comprises an assembly of the modules having a common intake manifold.

DETAILED DESCRIPTION

Referring to FIGS. 1 to 4, there is shown solar energy heating assembly 10 comprising a plurality of individual modules 11. While modules 11 have been shown in perspective view as being in an essentially vertical position, in use the assembly will be made to face toward the south and tilted at an approximate 60° angle from the horizontal.

Figure 4:
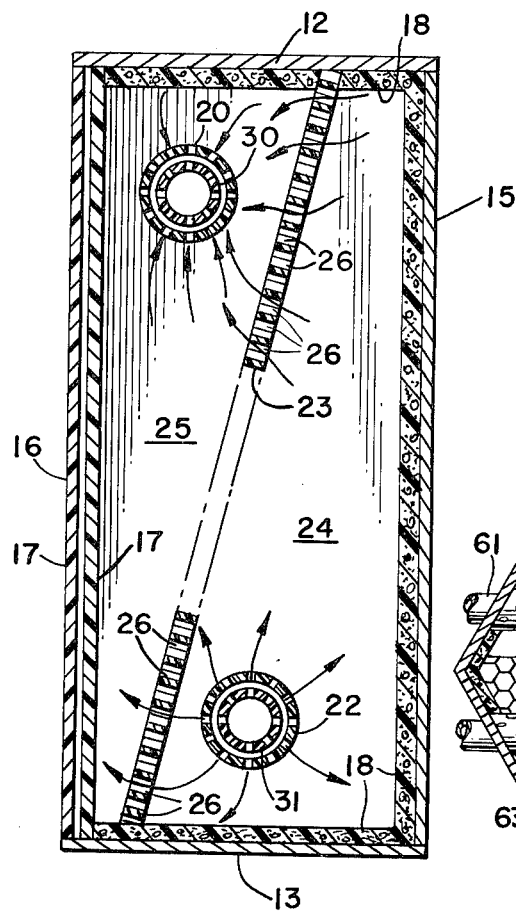
FIG. 4 is a sectional view taken along line 4—4 of FIG. 2.

The modules 11 comprise sealable fluid-tight chambers of generally rectangular shape formed by a top wall 12, bottom wall 13, side walls 14, rear wall 15, and front wall 16. All of the walls, with the exception of front wall 16, are preferably made of a non-heat conductive material, such as wood or plastic, although metals can also be used. Front wall 16 is formed of a transparent material such as glass or plastic film 17, preferably a plastic film such as polycarbonate (LEXAN). It is preferred to use two spaced-apart layers of plastic film 17 as best shown in FIG. 4; the spacing aiding in preventing heat loss through the front wall.

The interior of the chamber, again with the exception of front wall 16, is preferably lined with insulating material 18 such as an expanded plastic foam (Styrofoam) or any other material commonly used for this purpose. The exposed outer surface of insulating material 18 is covered with a heat absorbing material such as a black film or black paint of the type conventionally used.

Figure 3:
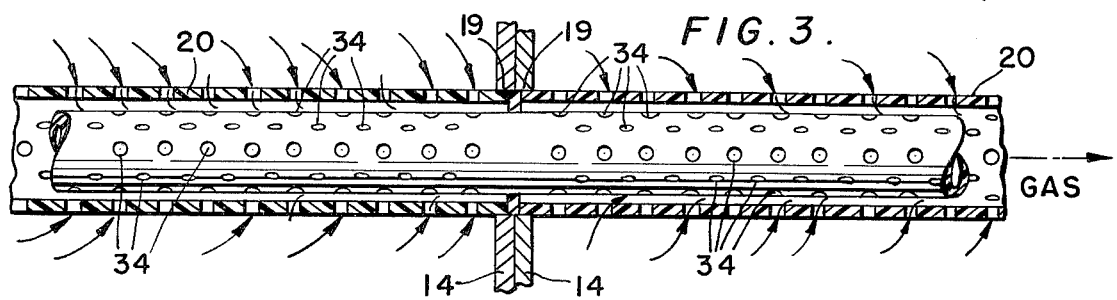
FIG. 3 is a sectional view taken along line 3—3 of FIG. 2.
Figure 6:
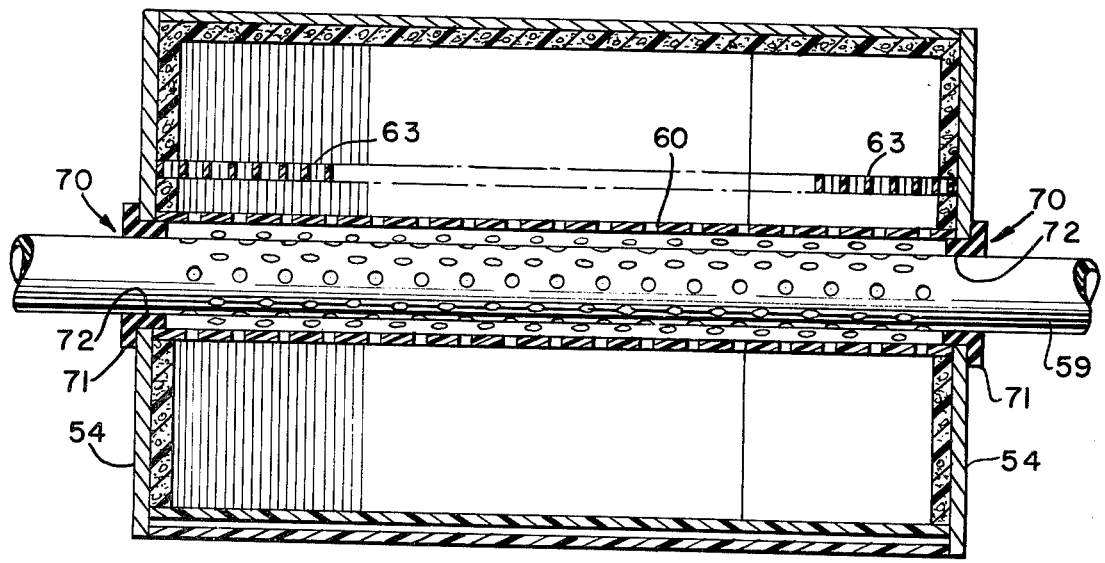
FIG. 6 is a sectional view taken along line 6—6 of FIG. 5.

Upper aligned openings 19 are provided in side walls 14 and upper perforated sleeve 20 extends across the interior of the module from one opening 19 to the other. Sleeve 20 can be attached to the chamber by having the diameter of openings 19 and sleeve 20 matched so that sleeve 20 is force-fit into openings 19 and securely held in place as shown in FIG. 3. Alternately, the sleeve can be held in place by seals as is illustrated in FIG. 6. Though not shown, the seals can be fashioned so that the flanges thereof extend for a substantial distance into the chamber. The flanges can then be perforated to aid in control of fluid flow as discussed below and sleeve 20 dispensed with. In like manner, lower aligned side openings 21 are provided in side walls 14 with lower perforated sleeve 22 or seals with extended flanges affixed therein and spanning the module 11. Although not depicted, there can be two or more upper and lower sleeves, or seals with extended flanges, utilized together with the necessary complementary additional upper and lower aligned openings.

Radiator means 23 are provided in the module and are attached to the insulation 18 as by nailing thereto or embedment therein. Radiator means 23, preferably extending diagonally from the top wall 12 to bottom wall 13, divide the interior of the module into fluid inlet compartment 24 and fluid outlet compartment 25 with perforated sleeve 22 in inlet compartment 24 and perforated sleeve 20 in outlet compartment 25. Radiator means 23 is preferably a cross-flow radiator of the honeycomb type having cells 26 therein permitting a ready passage of fluids therethrough in a cross-flow path. Such honeycomb is commercially available under the trade name "HEXCEL". Radiator means 23 is coated with a heat-absorbing material of same type used on insulating material 18. Honeycomb cells 26 act as heat traps and further give a greater amount of surface area to increase the heating efficiency of the module by collecting as much of the radiation as possible. In addition, as opposed to conventional flat plate collectors, honeycomb radiator 23 because of the depth of cells 26 can collect heat across a wide angle of sun exposure.

As used herein, the term "fluid" is intended to mean both liquids and gases, such as air and water, which can be heated by electromagnetic radiation such as the sun's rays.

Figure 1:
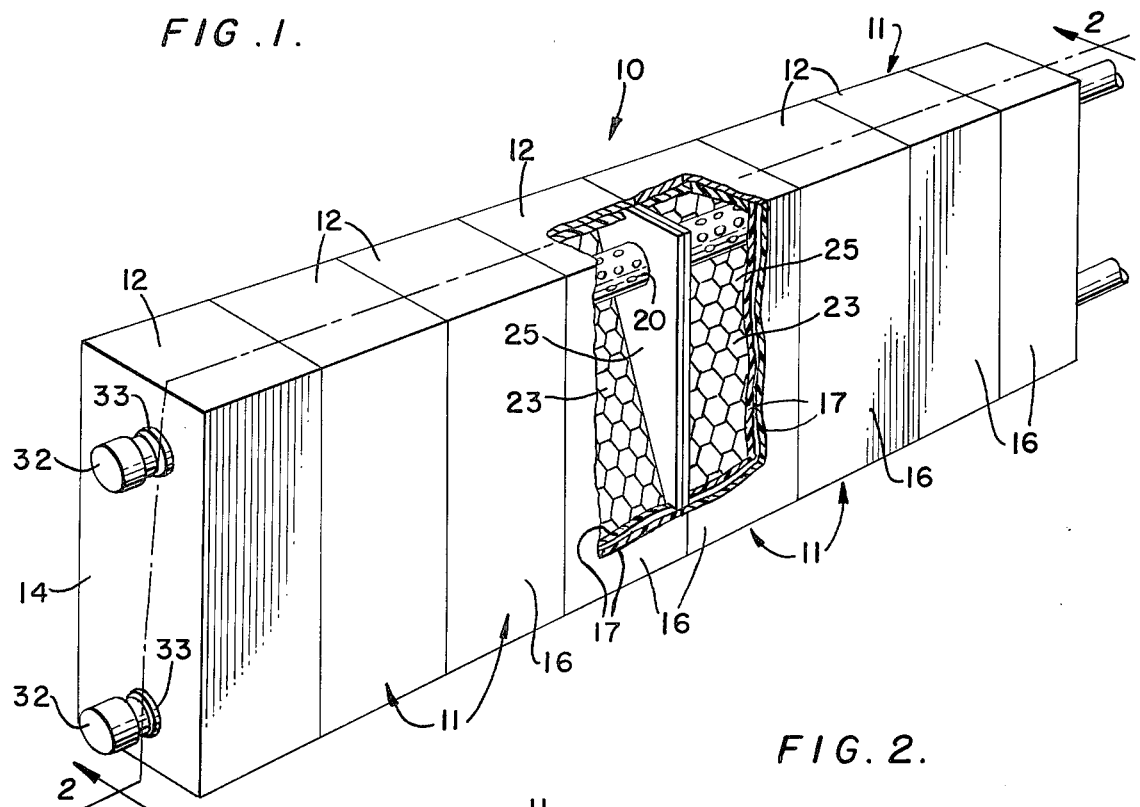
FIG. 1 is a perspective view, partially broken away, of an assembly of solar heating modules in accordance with the present invention.
Figure 2:
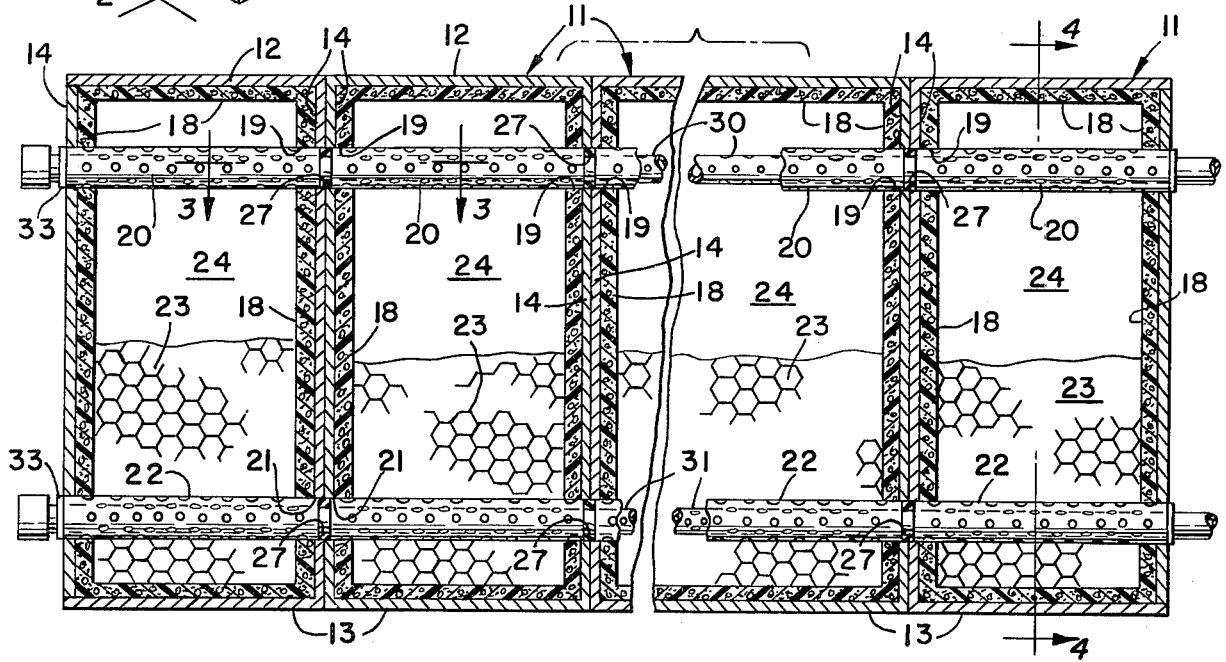
FIG. 2 is a sectional view taken along line 2—2 of FIG. 1.

As best shown in FIGS. 1 and 2, the individual modules 11 are assembled simply by placing one against the other in abutting relation and sealing the entire assembly by utilizing suitable sealing means such as bushings 27 at side wall openings 19 and 21. The bushings are of a size so as to also function to interconnect the perforated sleeves 20 and 22 in each of the modules to form, when the modules 11 are assembled, an aligned series of perforated sleeves 20 and sleeves 22 all being in fluid flow communication.

Perforated manifolds 30 and 31 made of metal or plastic, are then inserted through the perforated sleeves so as to extend through the entire module assembly with the outermost ends of each manifold suitably sealed as by attaching cap 32 thereto. Not shown is the fan or other means used to drive the fluid, such as water or air, into the bottom manifold 31 out through the perforations in the manifold 31 and sleeve 22 and into the chambers where the fluid is heated by the rays of the sun. The heated fluid, due to the force of the fan and by being heated, will flow into inlet compartment 24, through radiator 23, and into outlet compartment 25 where the fluid will enter into the perforations of sleeves 19 and manifold 30 to be returned to the structure being heated.

Suitable means such as gaskets 33 are utilized to seal the manifolds 30 and 31 where they extend beyond the limits of the module assembly. An important feature of the instant invention is that the manifolds are perforated only along certain spaced intervals of their length. This is best illustrated in FIG. 3 wherein the manifold 30 is not perforated for a portion of its length where the two modules are abutted. Perforations 34 can be varied in size so as to control the flow of fluid into the modules. Perforations in sleeve 22 can also be varied in size and location to assist in controlling the flow of fluid in conjunction with perforations in manifold 31. In addition, there is no need to insulate the manifolds since they are enclosed in modules 11.

It is readily apparent that a single module with the manifolds therein is suitable for use, but the instant invention provides the flexibility of having a plurality of the same size modules assembled to form a heating means capable of heating larger amounts of fluid. In addition, it is possible in each module, to eliminate the upper perforated sleeve 20 and manifold 31 in the module and simply utilize a single opening 19 in one of the side walls 14 of an individual module as an egress for the fluid to a manifold at the opening. Moreover, lower perforated sleeve 22 need not have perforations around its entire circumference, but only for a limited portion thereof permitting adjustment of the sleeve 22 during installation to vary fluid flow. While described with reference to a single module, it is intended that these modifications be applied to an assembly of a number of modules.

Thus, the modules 11 and manifolds 30 and 31 can be prefabricated and readily assembled on the site where they are to be used. Since every module has a standard size, the manifolds can be made so that the perforations are placed therein at the factory. The manifolds can be made of lengths much longer that the individual modules so that there is no need for welding, brazing, and/or gluing to unite individual pieces of manifold for the entire length of the assembly. The manifolds being of lengths much longer than that of combined number of modules it is a simple matter to simply cut off the excess length and cap the manifold as shown in FIG. 1. Thus, for purposes of illustration, the individual units of FIG. 1 can be made so as to be 4 feet wide by 8 feet high and to have a thickness of 6 inches. The thickness of the modules has been exaggerated in the drawings in order to be able to better illustrate the interior thereof. Thus, the eight modules shown in FIG. 1 will span a distance of 32 feet. A plastic pipe of 36 or 40 foot length can be prefabricated at the plant with perforations therein, inserted through the assembled modules on the site and the extra length simply sawed off and the sawed end capped as shown in FIG. 1.

It will be understood that the size of the individual units can be varied so as to enable production of several standard models having different BTU capacities when operating under optimum conditions. Thus, once the heating requirements of a structure are known, the number of already prefabricated modules needed to meet such requirements are brought to the site and assembled as discussed above. It will be evident that, by maintaining the height of the module as standard and by varying the width, it is possible to combine modules of varying heating capability to meet a wide variety of heating requirements.

Figure 5:
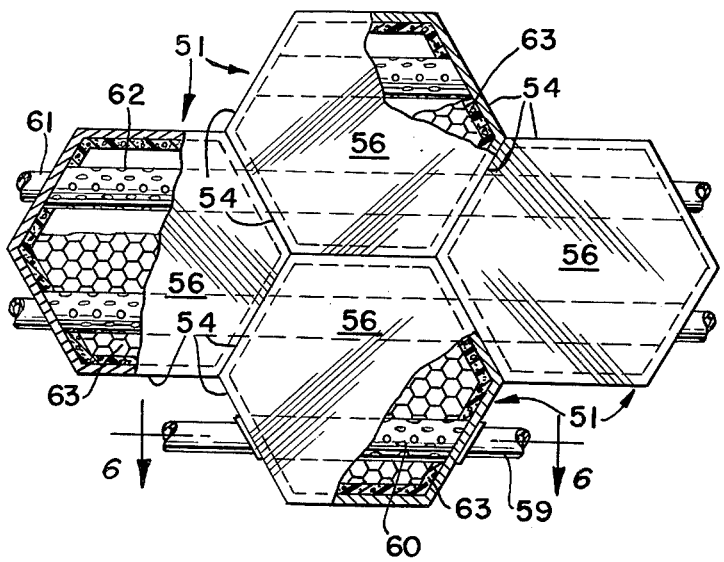
FIG. 5 is an elevational view, partially broken away, of an alternate embodiment of the present invention.

Referring to FIGS. 5 and 6, there is shown therein an alternate embodiment of the present invention wherein the individual modules are hexagonal in shape and can be combined as illustrated in FIG. 5 to give a honeycomb effect. Modules 51 having a hexagonal shape are combined so that their side walls 54 abut and the combined assembly presents a face consisting of the front walls 56 of modules 51. Several of modules 51 have been broken away to show honeycomb cross-flow radiators 63 therein as well as sleeves 60 and 62 and manifolds 59 and 61. The major difference in this embodiment is that a larger number of manifolds are required to pass fluid into and carry heated fluid from the module assembly. In FIG. 6, seals 70 are shown having cap portions 71 with flanges 72 extending therefrom into the chamber. Sleeve 60 is shown supported on flanges 72.

From the foregoing, it will be evident that a large variety of structural shapes can be used in accordance with the present invention, thus permitting use of the instant invention on a wide variety of buildings. In fact, in the instant invention, the modules can be incorporated, if desired, as part of the structure of the building by forming a portion of the roof or wall of the building that faces south.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A solar energy module comprising a sealable chamber having cross-flow radiator means having honeycomb cells and dividing said chamber into fluid inlet and outlet compartments, means to supply fluid to said inlet chamber including at least one perforated sleeve extending through said inlet compartment and supported by said chamber, and a perforated manifold extending through said inlet compartment and generally concentrically disposed within said perforated sleeve, wherein said manifold and said sleeve are positionable relative to each other for enabling adjustment in direction and volume of fluid flow through said sleeve.

2. The module of claim 1 including at least one perforated sleeve in said outlet compartment and a perforated manifold extending through the module through said perforated sleeve in said outlet compartment.

3. The module of claim 2 wherein the perforated sleeve in the inlet compartment is located in the bottom portion of the module, the perforated sleeve in the outlet compartment is located in the upper portion of the module, and the radiator means is a cross-flow radiator of the honeycomb type.

4. The module of claim 3 wherein the perforated sleeves communicate with openings in the side walls of the chamber.

5. A solar energy heating assembly comprising a plurality of modules including a sealable chamber having cross-flow radiator means having honeycomb cells and dividing said chamber into fluid inlet and outlet compartments, means to supply fluid to said inlet chamber including at least one perforated sleeve extending through said inlet compartment and supported by said chamber, and a perforated manifold extending through said inlet compartment and generally concentrically disposed within said perforated sleeve, each of said modules abutted together wherein said manifold and said sleeve are positionable relative to each other for enabling adjustment in direction and volume of fluid flow through said sleeve.

6. An assembly as set forth in claim 5 wherein respective ones of perforated sleeves extend through and are supported by each of said outlet compartments in each of said modules and a perforated manifold extends through and is supported by said assembly such that it is disposed within said sleeves in said outlet compartment wherein said second manifold is relatively movable with respect to said sleeves in said outlet compartment for enabling continuous adjustment in direction and volume of fluid flow therethrough.

* * * * *